United States Patent
Sheikhaleslami et al.

(10) Patent No.: US 8,420,729 B2
(45) Date of Patent: Apr. 16, 2013

(54) METHOD OF PREPARING PHENOLIC RESIN/CARBON NANO MATERIALS (HYBRID RESIN)

(76) Inventors: Mohamad Ali Sharif Sheikhaleslami, Tehran (IR); Farhad Golestanifard, Tehran (IR); Hossein Sarpoolaky, Tehran (IR)

( * ) Notice: Subject to any disclaimer, the term of this patent is extended or adjusted under 35 U.S.C. 154(b) by 688 days.

(21) Appl. No.: 12/499,121

(22) Filed: Jul. 8, 2009

(65) Prior Publication Data
US 2009/0318606 A1   Dec. 24, 2009

(51) Int. Cl.
*C08K 3/04*   (2006.01)
(52) U.S. Cl.
USPC ........... 524/496; 524/495; 524/847; 977/734; 977/742; 977/750; 977/752; 977/778

(58) Field of Classification Search .................. 524/495, 524/496, 847; 528/86; 977/734, 742, 750, 977/752, 773, 778
See application file for complete search history.

(56) References Cited

U.S. PATENT DOCUMENTS

| | | | |
|---|---|---|---|
| 6,099,965 A * | 8/2000 | Tennent et al. | 428/408 |
| 2006/0041104 A1* | 2/2006 | Ait-Haddou et al. | 528/397 |
| 2007/0265379 A1* | 11/2007 | Chen et al. | 524/404 |

* cited by examiner

*Primary Examiner* — Ling Choi
*Assistant Examiner* — Darcy D Laclair Lynx
(74) *Attorney, Agent, or Firm* — Barry Choobin; Choobin & Choobin Consultancy

(57) ABSTRACT

It is disclosed a method for preparing a nano hybrid resin containing carbon nano materials as graphitizing agents with predetermined characteristics by formation of graphite phase in residual carbon.

2 Claims, 1 Drawing Sheet

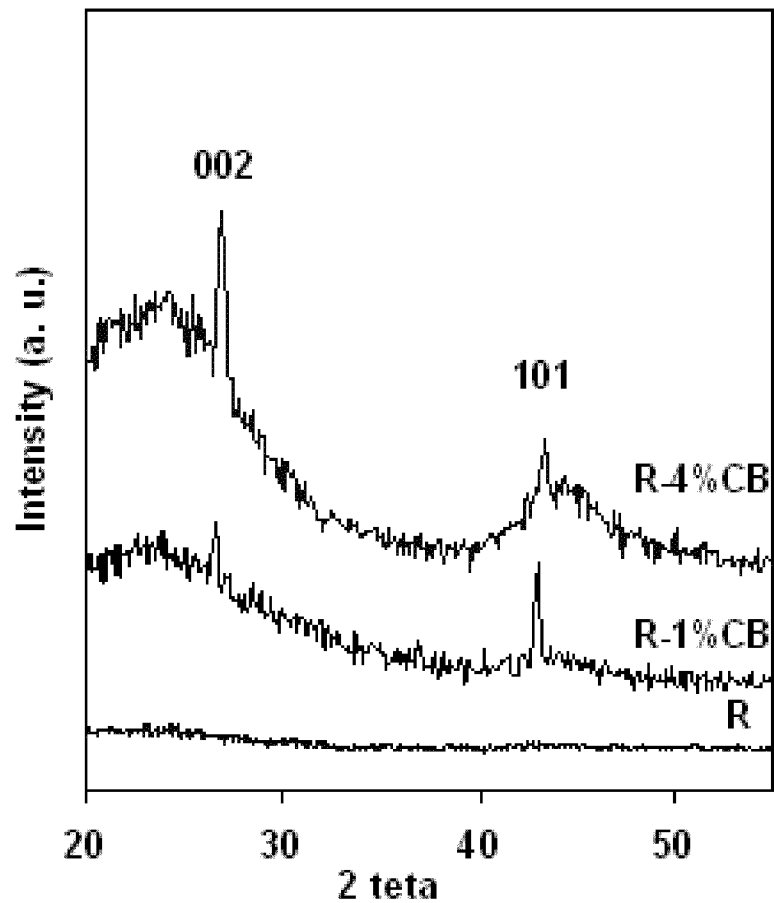

METHOD OF PREPARING PHENOLIC RESIN/CARBON NANO MATERIALS (HYBRID RESIN)

THE SPONSORSHIP STATEMENT

The present invention is sponsored by The Iranian Nanotechnology Initiative Council for international filing.

FIELD OF THE INVENTION

The present invention is related to material science and engineering. In particular, it belongs to nano technology and colloidal science.

BACKGROUND OF THE INVENTION

Phenolic resin is widely used as binding agent with high carbon yield in many applications such as carbon containing refractory and carbon-carbon composites. Phenolic resin converts to brittle solid mass called resit during curing process (above 200° C.) and then with increasing the temperature it converts to carbonaous phase (residual carbon) which it is responsible for final carbon binding in such structures. However certain drawbacks of residual carbon of phenolic resin cause limiting application of phenolic resin as binding agent. Basically these drawbacks arise from glassy structure of residual carbon which results in low mechanical strength and poor oxidation resistance versus graphite phase structure. Thus, the formation of graphite phase after heating process in residual carbon of resin overcomes above shortcomings in respect to properties of residual carbon of phenolic resin.

Therefore, it would be advantageous to incorporate the formation of graphite phase in residual carbon by introducing carbon nano materials as graphitizing agents in the matrix of phenolic resin. The formation of graphite phase in this structure facilitates a plurality of superior properties of graphite into glassy carbon resulting in improving residual carbon properties of phenolic resin.

SUMMARY OF THE INVENTION

The principal object of the present invention is to provide a method of preparing a nano hybrid resin with a predetermined characteristic to apply in carbon containing refractories and in carbon-carbon composites, wherein said nano hybrid resin comprises of carbon nano materials and phenolic resin, wherein the method comprises steps of:
a) Obtaining a colloidal dispersion of said carbon nano material wherein said carbon nano material comprises of carbon black and carbon nano tube, by simultaneously mixing and ultrasonicating said carbon nano material in an organic solvent wherein said organic solvent comprises ethylene glycol and/or 1, 2 propandiol, and wherein said organic solvent is selected form a group consisting of phenolic resin solvent;
b) Adding said colloidal dispersion of said carbon nano material to said phenolic resin by 10-15% by weight; and
c) Mixing said colloidal dispersion of said carbon nano material with said phenolic resin to obtain said nano hybrid resin and wherein said nano hybrid resin is applied to make carbon containing refractories and carbon-carbon composites.

Yet another object of the present invention is to provide a method of preparing a nano hybrid resin comprising step of: converting a predetermined amount of residual carbon of nano hybrid resin into graphite phase by a predetermined amount of carbon nano materials as graphitizing agent, wherein said graphite phase comprises predetermined properties.

Yet another object of the present invention is to provide a method of preparing a nano hybrid resin comprising step of: transferring said predetermined characteristic of said graphite phase to said predetermined amount of residual carbon of nano hybrid resin.

Yet another object of the present invention is to provide a method of preparing a nano hybrid resin comprising step of: transferring said predetermined characteristic of said nano hybrid resin to said carbon containing refractotories.

Yet another object of the present invention is to provide a method of preparing a nano hybrid resin comprising step of: transferring said predetermined characteristic of nano hybrid resin to said carbon-carbon composites.

Yet another object of the present invention is to provide a method of preparing phenolic resin/carbon nano materials (hybrid resin) and its application in improving final properties of MgO—C refractory and carbon-carbon composites.

Yet another object of the present invention is to provide a resin called nano hybrid resin with specific characteristics.

Yet another object of the present invention is to provide a resin with ability to be converted to graphite phase at low temperature.

Yet another object of the present invention is to provide a method for modifying a non-graphitizing conventional resin by carbon nano materials which results in formation of graphite in final residual carbon of phenolic resin.

Yet another object of the present invention is to provide a method for formation of graphite in final residual carbon of phenolic resin which changes the residual carbon of phenolic resin into residual carbon of nano hybrid resin with improved characteristics in respect to residual carbon of phenolic.

Yet another object of the present invention is to provide a carbon nano material which comprises carbon black and carbon nanotubes as a graphitizing agent.

Yet another object of the present invention is to increase the degree of graphitization in residual carbon by increasing crystallinity of carbon nano material from carbon black to Carbon Nano Tubes.

Yet another object of the present invention is to increase oxidation resistance of nano hybrid resin.

BRIEF DESCRIPTION OF THE DRAWINGS

FIG. 1. Illustrates a comparison of XRD pattern of Conventional resin and hybrid resin containing carbon nano tube and carbon black of the present invention.

DETAILED DESCRIPTION OF THE INVENTION

The present invention adopts a method to introduce carbon nano materials into phenolic resin and preparation of hybrid organic inorganic nanocomposite resin. The present invention discloses ethylene glycol and/or 1, 2 propandiol as the organic solvent of phenolic resin and as a media for preparation of colloidal dispersion of carbon nano particles including carbon black N220 and carbon nanotubes. The mentioned colloidal suspension is prepared by the organic solvent and carbon nano material with weight ratio of 1:100 for carbon nano tubes and 4:100 for carbon black. The suspension is ultrasonicated (Power 400 W) under striation for 1 h. Optimized process for preparing colloidal dispersion is achieved by varying different parameter such as the amount of solvent and time of ultrasonic process. As prepared colloidal mixture is added to resol type phenolic resin by 10-15 wt. % (as optimum range) followed by 15 min striation.

Novel Resin Properties

By heating at 1100° C. of both conventional and hybrid resin we study phase evolution of residual carbon. As shown in FIG. 1 sharp diffraction pattern of graphite in XRD pattern of hybrid resin containing both carbon black and carbon nanotube is indexed. Also hybrid resin containing CNT seem to have higher potential of graphitization in lower amount of carbon nano material as graphitizing agent. Next we prepared MgO—C refractory bricks in industrial scale as well as 2 dimensional carbon-carbon composite in industrial scale and studied the improvement in final properties of these structures prepared by novel resin of the present invention.

Physical and Mechanical Properties of Refractory Bricks

Table 1 presents physical and mechanical properties of conv. MgO—C bricks (sample1) and bricks prepared by nano hybrid resin (sample 2) containing carbon black as graphitizing agent.

TABLE 1

Physical and mechanical properties of conv. and novel refractory containing 10% of graphite cured and heated at 1100 and 1300° C.

| | Properties (Cured) | | | | 1100° C. | | | | 1300° C. | | | |
|---|---|---|---|---|---|---|---|---|---|---|---|---|
| | Physical | | Mechanical | | Physical | | Mechanical | | Physical | | Mechanical | |
| Sample | A.P. (%) | B.P. (gr/cm$^3$) | CCS (MPa) | MOR (MPa) | A.P. (%) | B.P. (gr/cm$^3$) | CCS (MPa) | MOR (MPa) | A.P. (%) | B.P. (gr/cm$^3$) | CCS (MPa) | MOR (MPa) |
| 1 | 2.55 | 3.03 | 42.6 | 13 | 10 | 2.93 | 22.4 | 2.9 | 10.1 | 2.92 | 20.9 | 3.9 |
| 2 | 3.4 | 3.07 | 53.2 | 15 | 9.1 | 3.03 | 28 | 3.5 | 9.8 | 3.03 | 35.9 | 4.9 |

As seen after curing process, refractory bricks prepared by hybrid resin showed improvement in mechanical properties and no significant difference was observed in view of physical properties. This is related to better compaction and better wetting of refractory particles by novel resin as it is seen in preparing the refractory bricks in practice.

However, all samples were heated at 1100 and 1300° C. to convert resit into residual carbon and all properties were measured to study the effect of residual carbon as the main bonding agent in conventional resin and novel refractory.

By comparing the results of these samples different objects are achieved comprising: the values of apparent porosity of sample 2 in comparison to sample 1 have been decreased in all temperatures. The presence of nano carbon in hybrid resin leading to increasing in carbon yield and better compaction of bricks prepared by hybrid resin are the main reasons for decreasing apparent porosity.

Also mechanical properties of sample 2 showed noticeable improvements. Comparing the samples heated at 1300 C the increase in Module of Rupture (MOR) and Cold Crushing Strength value is seen by 25% and 75% for sample preparing by hybrid resin. Module of Rupture (MOR) is directly related to strength of bonding which showed that residual carbon of nano resin has higher strength and modulo of elasticity.

Corrosion Test

TABLE 2

Rotary slag corrosion test of conventional and nano resin

| | Composition | | | CB | Corrosion rate (depth of |
|---|---|---|---|---|---|
| Sample | MgO | Graphite | Others | N220 | penetration (%)) |
| 1 | 90 | 10 | 1 | — | 8.86 |
| 2 | 90 | 10 | 1 | 0.024 | 5.12 |
| 3 | 87 | 12 | 1 | — | 7.01 |

Rotary slag corrosion test based on ASTM C874 of three kinds of refractory bricks including conventional samples 1 and 3 and the refractory sample 2, which was prepared by the present invention nano hybrid resin was carried out as the main test to evaluate improvement of refractory in working conditions. For this purpose, the samples were arranged on the wall of the furnace test and then the furnace was heated up to 1600° C. and the corrosion of bricks against steel slag for 20 hours was carried out. Also for adopting the condition near to real one the furnace was circulated slowly. The samples were then crossed perpendicular to corrosion direction and the amount of slag penetration in comparison to initial width was calculated as presented in table 2.

As shown the penetration depth of slag into refractory was measured and the percent of slag penetration into refractory has been chosen as criterion of corrosion resistance. For conventional samples containing 10 and 12 percent of graphite the amount of slag penetration were calculated of 8.86 and 7.01% respectively. On the other hand novel refractory prepared by 10 wt. % of graphite showed 5.12% of corrosion penetration. Comprising conventional and novel refractories containing 10% of graphite the corrosion resistance of novel refractory decreased by 40%. Also the results showed that the novel refractory corrosion decreased by 20% by comparing with conv. refractory having 2% of more graphite. As a result, the present invention decreases the amount of graphite in carbon bearing refractories by 2 wt. % without any decrease in durability and corrosion resistance.

The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method for preparing a nanohybrid resin of carbon nanomaterials and phenolic resin to be applied in carbon containing refractories and in carbon-carbon composites, wherein said method comprises the steps of
  a) mixing and ultrasonicating said carbon nanomaterial in an organic solvent to obtain a colloidal dispersion of carbon nanomaterial wherein said carbon nanomaterial comprises carbon black and carbon nano tube and said organic solvent comprises ethylene glycol and/or 1,2 propanediol;
  b) adding and mixing 10-15% by weight of the colloidal dispersion of said carbon nanomaterial to phenolic resin to obtain said nanohybrid resin, wherein said carbon nanomaterials act as a graphitizing agent during conversion of the resin to a graphite phase; and
  d) Heating or firing said nanohybrid resin at 1100° C. to obtain a residual carbon containing refractory.

2. The method as claimed in claim 1, wherein said method further comprises step of: transferring said graphite phase to said residual carbon of nano hybrid resin.

* * * * *